United States Patent [19]

Miyoshi et al.

[11] 4,437,178

[45] Mar. 13, 1984

[54] RECORD PLAYER

[75] Inventors: Seizo Miyoshi, Neyagawa; Bunitsu Yamaguchi, Yawata, both of Japan

[73] Assignee: Matsushita Electric Industrial Co., Ltd., Osaka, Japan

[21] Appl. No.: 304,339

[22] Filed: Sep. 21, 1981

[51] Int. Cl.³ .................. G11B 17/04; G11B 25/04
[52] U.S. Cl. ........................... 369/75.1; 369/292; 369/210
[58] Field of Search ............... 369/75, 210, 270, 271, 369/292, 75.1

[56] References Cited

U.S. PATENT DOCUMENTS

| | | | |
|---|---|---|---|
| 3,827,698 | 8/1974 | Sostero | 369/210 |
| 4,002,826 | 1/1977 | Iemenschot | 369/270 |
| 4,093,152 | 6/1978 | Peters | 369/75 |

Primary Examiner—Steven L. Stephan
Attorney, Agent, or Firm—Wenderoth, Lind & Ponack

[57] ABSTRACT

An improved phonographic record player in which a plurality of phonographic records mounted on a changer spindle are arranged to be positively held to be horizontal by a record presser movably mounted in a dust cover of the record player.

15 Claims, 15 Drawing Figures

RECORD PLAYER

BACKGROUND OF THE INVENTION

The present invention generally relates to a record player, and more particularly, to a phonographic record player on which a record changer spindle may be mounted for automatically playing a plurality of phonographic discs or records continuously.

Generally, in record players equipped with a record changer spindle (referred to as a changer spindle hereinbelow) for continuous and automatic playing of a plurality of records one after another as referred to above, it is necessary to maintain horizontally, a large number of records mounted in a stack on the changer spindle so as to positively lower, the records one-by-one, onto a turntable of the record player. Therefore, in the record player as described above, it has been so arranged that, as means for holding the plurality of records stacked on the upper part of the changer spindle to be horizontal, there is separately provided a control arm which is adapted to contact the surface of the record located at the top of the stack of records.

However, for playing records, the known arrangement as described above requires troublesome procedures such as setting of the control arm with respect to the plurality of records mounted on the changer spindle, and subsequent closing of a dust cover of the record player, etc., thus being not only complicated in construction, but very inconvenient in actual operation.

SUMMARY OF THE INVENTION

Accordingly, an essential object of the present invention is to provide an improved record player in which a plurality of records mounted on a changer spindle are positively maintained to be horizontal by a simple construction, without the necessity for a control arm or the like separately provided.

Another important object of the present invention is to provide an improved record player of the above described type which functions stably with high reliability and which can be manufactured on a large scale at low cost.

In accomplishing these and other objects, according to one preferred embodiment of the present invention, there is provided a record player which includes a main body, a turntable rotatably mounted on the main body for placing a record to be played thereon, a changer spindle for records, mounted at the central portion of the turntable, a dust cover rotatably or pivotally mounted on the main body for selective closing or opening with respect to the main body, and a record presser movably mounted at the central portion of the dust cover for movement in an axial direction of the changer spindle. The record presser is arranged to be pressed against the upper surface of the records mounted at the upper portion of the changer spindle when the dust cover is turned downward to be closed, and thus, the records mounted on the changer spindle are held to be horizontal by the record presser itself.

By the arrangement of the present invention as described above, an improved record player has been advantageously presented with substantial elimination of disadvantages inherent in the conventional record players of this kind.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout the several views of the accompanying drawings.

DETAILED DESCRIPTION OF THE INVENTION

Figure 1:
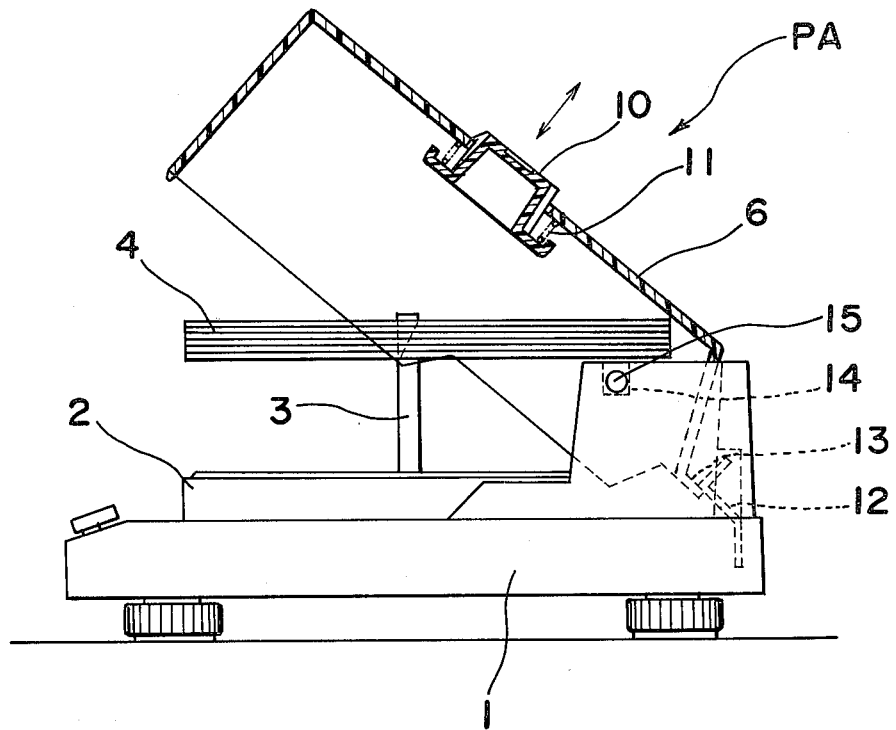
FIG. 1 is a schematic side sectional view of a record player according to one preferred embodiment of the present invention.
Figure 2:
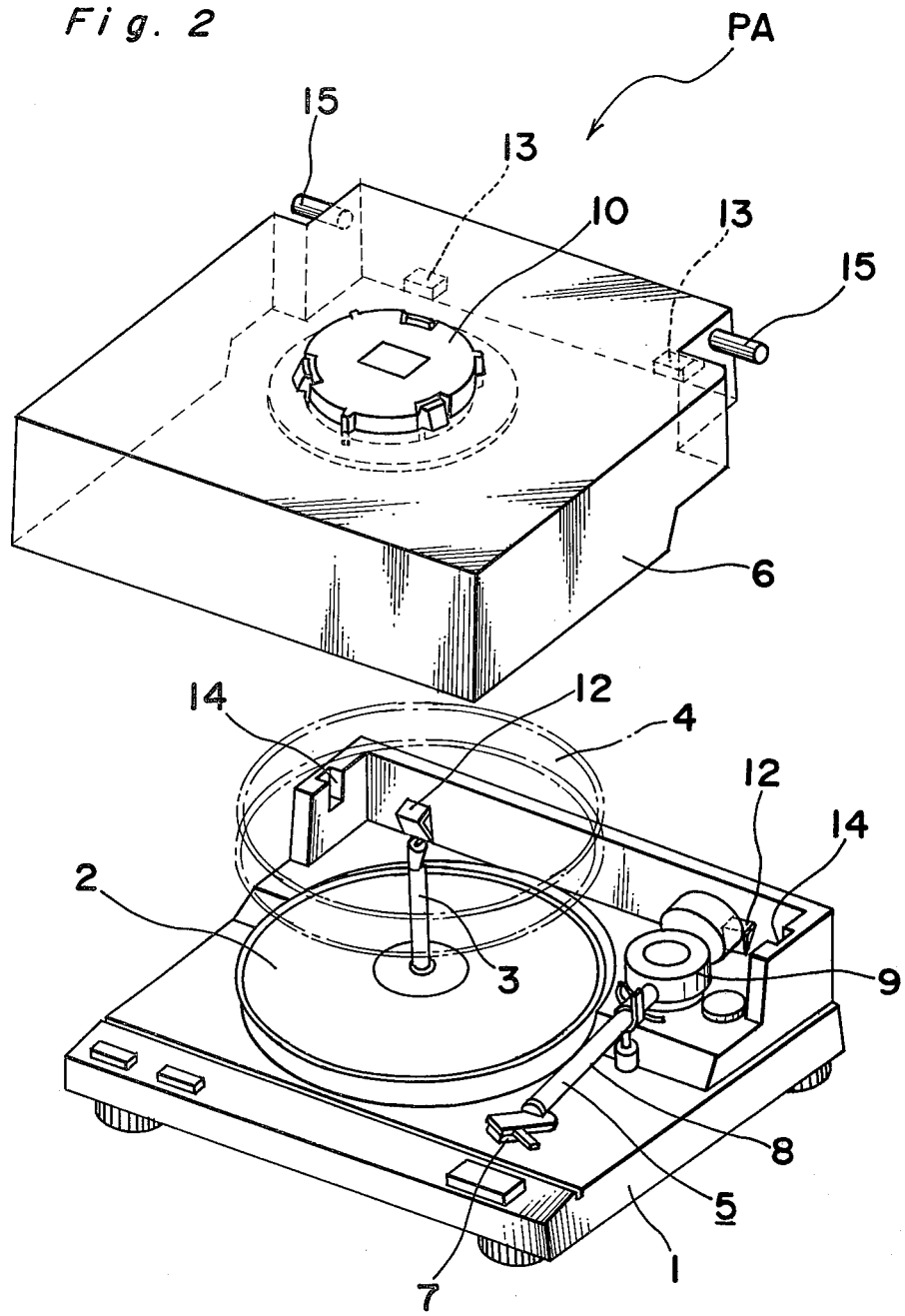
FIG. 2 is an exploded perspective view of the record player of FIG. 1.

Referring now to the drawings, there is shown in FIGS. 1 and 2 an improved record player PA according to one preferred embodiment of the present invention. The record player PA generally includes a main body 1 of a rectangular cubic box-like configuration, a turntable 2 rotatably mounted on the upper surface of the main body 1, a changer spindle 3 which is releasably mounted on a hollow spindle (not shown) provided at the central portion of the turntable 2, and on the upper portion of which a plurality of phonographic discs or records 4 are to be mounted in a stack, a tonearm arrangement 5 for tracing sound grooves (not shown) of the records 4 successively lowered onto the turntable 2 changer spindle 3, and a dust cover 6, for example, of a transparent plastic material or the like pivotally provided on the main body 1 for selective upward or downward rotation, i.e. selective opening or closing with respect to main body 1 so as to cover turntable 2, changer spindle 3, stack of the records 4, and the tonearm arrangement 5 when closed.

The tonearm arrangement 5 as described above further includes a tonearm 8 having a pickup cartridge 7 at its forward end, and pivotally supported on the main body 1 through an arm base 9 for movements in the vertical and lateral directions in the known manner. The tonearm 8 is so arranged, in its function, as to return to a rest position as shown in FIG. 2 upon completion of playing of one record 4 placed on the turntable 2, and to play another one record subsequently placed onto the turntable 2 when a record 4 located at the bottom of the stack of the records mounted on the changer spindle 3 is lowered onto turntable 2, in association with the functioning of changer spindle 3, turntable 2, etc. More specifically, the tonearm arrangement 5 is adapted to continuously and automatically play each one of the records 4 successively lowered onto the turntable 2 from the stack of the records mounted on the upper portion of changer spindle 3.

On the other hand, at the upper central portion of the dust cover 6, there is slidably or movably provided a record presser 10 which is to be brought into contact with the record 4 located at the top of the stack of records mounted on changer spindle 3 when the dust cover 6 is turned downward for closing, with record presser 10 being urged downwardly as viewed in FIG. 2 by a coil spring 11 (FIG. 4) in a manner as described in detail later. Meanwhile, the dust cover 6 is provided, at its rear edge, with a pair of spaced projections 13 which engage corresponding support springs 12 provided on the main body 1, and also is provided, at its opposite rear side walls, with support pins 15 extending outwardly therefrom and engageable with corresponding recesses 14 formed in the main body 1. In the normal closed state, the dust cover 6 has its support pins 15 received in the recesses 14, and its projections 13 are engaged with the support springs 12 of the main body 1 so as to maintain the closed state thereof, while it is adapted to be pivotable or rotatable, and detachable with respect to main body 1.

Figure 3A:
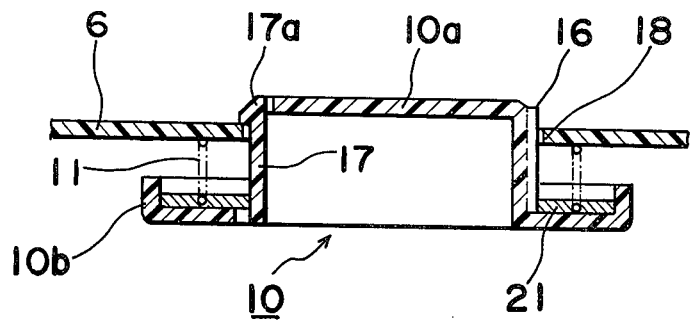
FIG. 3(a) is a fragmentary sectional view, showing on an enlarged scale an essential portion of a dust cover having a record presser fitted therein.
Figure 3B:
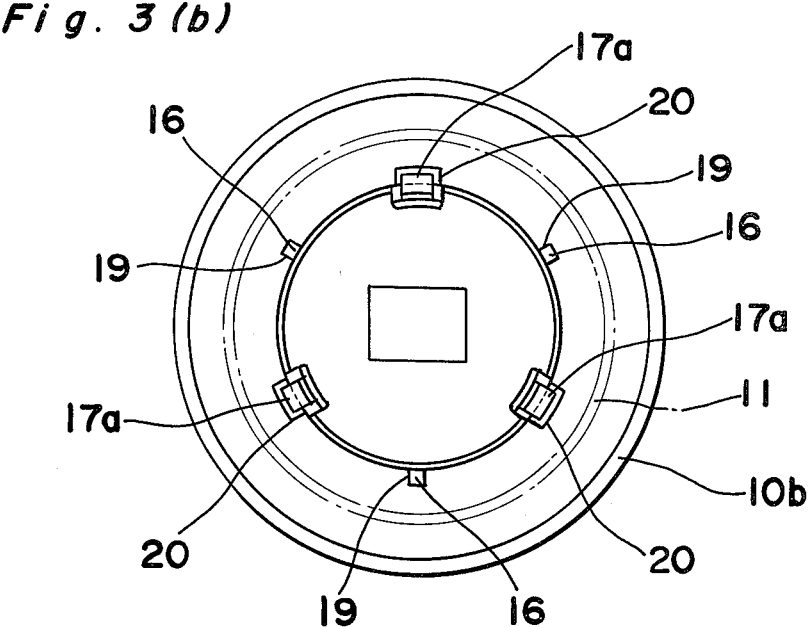
FIG. 3(b) is a top plan view of the record presser of FIG. 3(a)
Figure 3C:
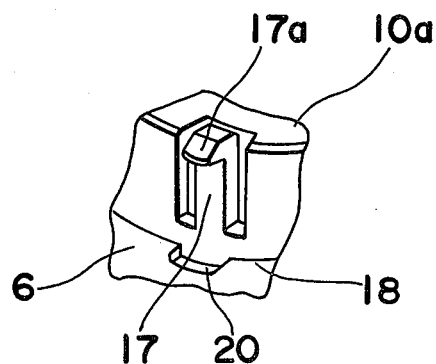
FIG. 3(c) is a fragmentary perspective view of the record presser of FIG. 3(b)
Figure 4:
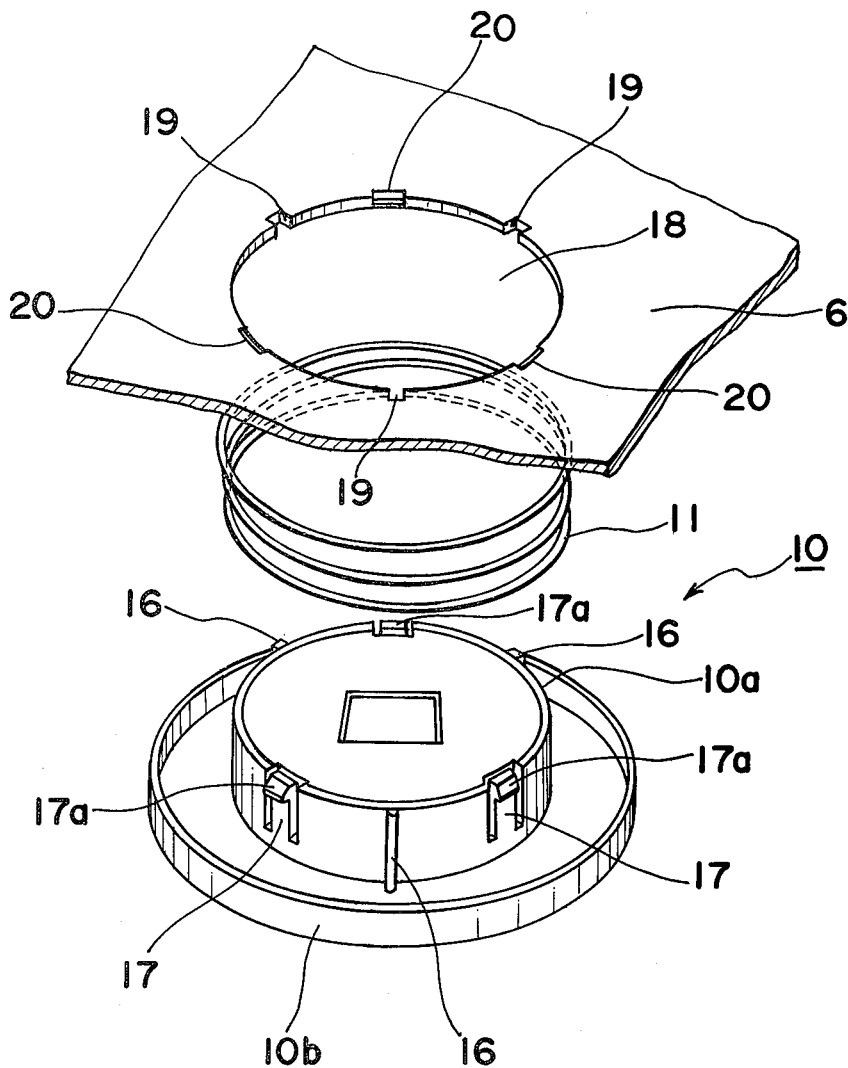
FIG. 4 is an exploded perspective view of an essential portion of the dust cover particularly showing an arrangement for mounting the record presser of FIGS. 3(a) to 3(c), FIGS. 5 and 6 are views similar to FIG. 1, which particularly illustrate the state of functioning of the record player of FIG. 1.

Referring also to FIGS. 3(a) to 4, the record presser 10 is formed into a cylindrical configuration closed at the top, with an annular flange portion 10b being provided to extend outwardly from the lower peripheral edge of a cylindrical portion 10a as is most clearly seen in FIG. 4. In the outer peripheral surface of the cylindrical portion 10a of record presser 10, a plurality of axial projections 16 are provided at equal circumferential intervals, while resilient tongues 17, each having a stopper claw 17a formed at the free distal end thereof, are provided between retaining projections 16. On the other hand, at the central portion in the upper surface of the dust cover 6, there is formed a through-opening 18 for receiving therein the cylindrical portion 10a of the record presser 10, and in the peripheral inner edge of the through-opening 18, corresponding recesses 19 are formed to receive the retaining projections 16 of the record presser 10, while in the surface of the dust cover 6 between recesses 19, recessed edges 20 are formed into which the stopper claws 17a of the resilient tongues 17 are respectively fitted.

For mounting the record presser 10 having the construction as described above onto the dust cover 6, the coil spring 11 is disposed around the cylindrical portion 10a, with a washer 21 (FIG. 3(a)) placed on the flange portion 10b, and upon insertion of the cylindrical portion 10a into the through-opening 18 of the dust cover 6, the retaining projections 16 of the record presser 10 are received in the corresponding recesses 19 formed in the inner edge of the opening 18, while the stopper claws 17a provided at the distal ends of the resilient tongues 17 are fitted into the recessed edges 20 also formed in the inner edge of the through-opening 18. Thus, the record presser 10 is non-rotatably mounted onto the dust cover 6 only for vertical or axial movement, while being urged inwardly by the spring 11 with respect to dust cover 6.

Figure 5:
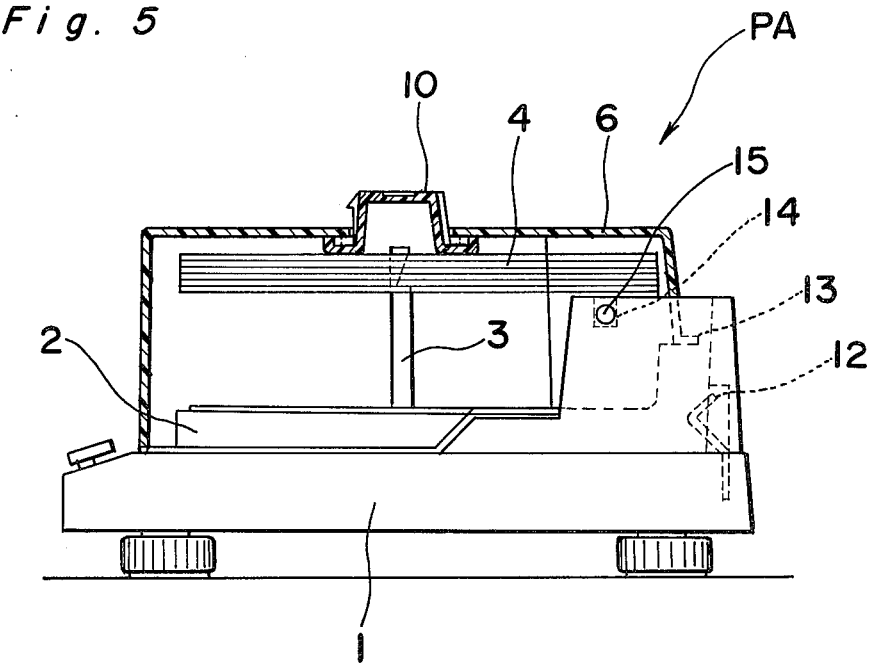
Figure 6:
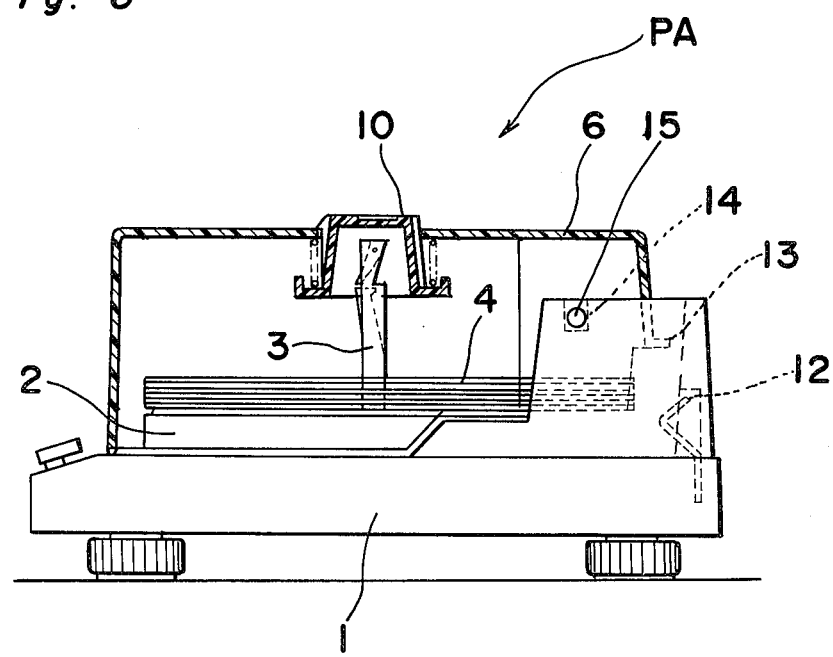

By the above arrangement, when the dust cover 6 is closed as shown in FIG. 5, with the stack of the plurality of records 4 being mounted at the upper portion of the changer spindle 3, the record presser 10 provided in the dust cover 6 as described above is brought into contact with the upper surface of the uppermost record 4 in the stack of records 4 so as to compress the coil spring 11, whereby the record presser 10 tends to be depressed downward by the urging force of the coil spring 11, and thus, the records 4 are held to be horizontal. Even when the records 4 in the stack mounted on the changer spindle 3 is lowered, one by one, onto the turntable 2 following the automatic playing of the records, the records 4 on the changer spindle 3 may still be held to be horizontal, since the record presser 10 is gradually depressed downward by the urging force of the coil spring 11. In the above case, since the load by the coil spring 11 has only to be of such an extent as will be just sufficient to hold the records 4 to be horizontal, and may be relatively small compared to the weight of the dust cover, there is no possibility that the dust cover 6 is undesirably raised thereby. Meanwhile, when all of the records 4 mounted on the changer spindle 3 are lowered onto the turntable 2 as shown in FIG. 6, the record presser 10 is held to be approximately horizontal at the central portion of the dust cover 6 as shown, and therefore, there is no unbalanced appearance from the aspect of design.

It should be noted here that, in the foregoing embodiment, although the record presser 10 is described as arranged to be depressed inwardly with respect to the dust cover 6 by the urging force of the coil spring 11 so as to be brought into contact with the upper surface of the uppermost record in the stack for holding records to be horizontal, the concept of the present invention is not limited in its application to the above, but may be modified in various ways within the scope of the invention. For example, the coil spring 11 may be dispensed with, by forming the record presser of a material having a large specific gravity, or by increasing the weight of the record presser 10 through employment of a washer made of iron and the like and secured to the record presser 10.

Meanwhile, for detecting completion of playing of the plurality of records in the automatic record playing mode, it may be so arranged that, with the changer spindle 3 adapted to be vertically movable, the continuous playing is effected by lowering the changer spindle 3 when the record is set and the weight of the dust cover 6 is applied onto the changer spindle 3, while the termination of playing is detected through utilization of rising of the changer spindle 3 upon falling of the last record in the stack onto the turntable 2.

Furthermore, the inclination of the record upon opening of the dust cover 6 when only one record is set on the changer spindle 3, may be prevented through modifications of the positions of the support pins 15 for the pivotal axis, i.e. rotational center of the dust cover 6 and the configuration of the ceiling portion of the dust cover in various ways.

Figure 10:
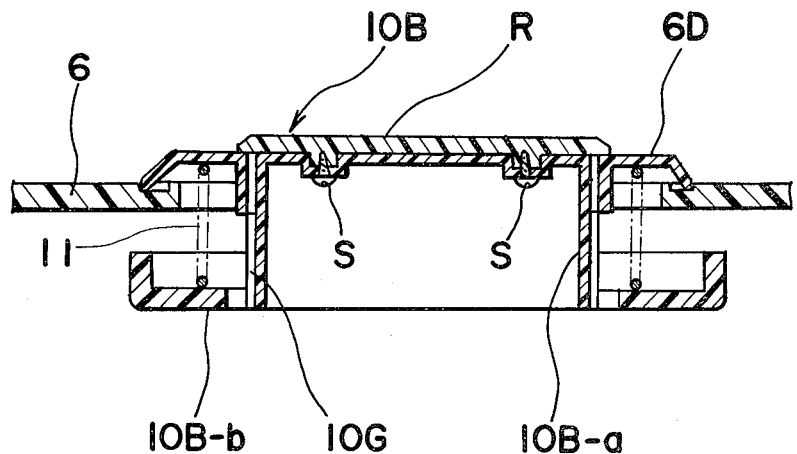
FIG. 10 is a side sectional view of a dust cover showing the assembled state of the modified record presser of FIG. 9, FIGS. 11 and 12 are views similar to FIGS. 5 and 6, which particularly show the state of functioning of the modified record player of FIG. 7.

Referring to FIGS. 7 to 13, there is shown a modification of the record player PA of FIGS. 1 through 6 described above. In the modified record player PB shown in FIGS. 7 to 13, the record presser 10 described as employed in the arrangement of FIGS. 1 to 6 is replaced by a modified record presser 10B (FIG. 7), in which a cylindrical portion 10B-a having a flange portion 10B-b (FIG. 9) extending outwardly from the lower edge thereof is formed, in its outer peripheral surface, with a plurality of spiral grooves 10G, while an annular member 6D having a corresponding number of spiral projections 6P formed on its peripheral inner edge is fitted into the through-opening 18 (FIG. 4) of the dust cover 6 to be fixed to dust cover 6. For assembly, the cylindrical portion 10B-a is fitted into the annular member 6D suitably secured to the dust cover 6, with the coil spring 11 placed on the flange portion 10B-b and the spiral projections 6P of the annular member 6D engaged with the grooves 10G of the cylindrical portion 10B-a. For retaining the cylindrical portion 10B-a within the annular member 6D, there is further provided, on the annular member 6D, a retaining ring R having a plurality of threaded studs Ra, into which fixing screws S are screwed through openings O formed in the closed top portion of the cylindrical portion 10B-a (FIG. 10).

Figure 11:
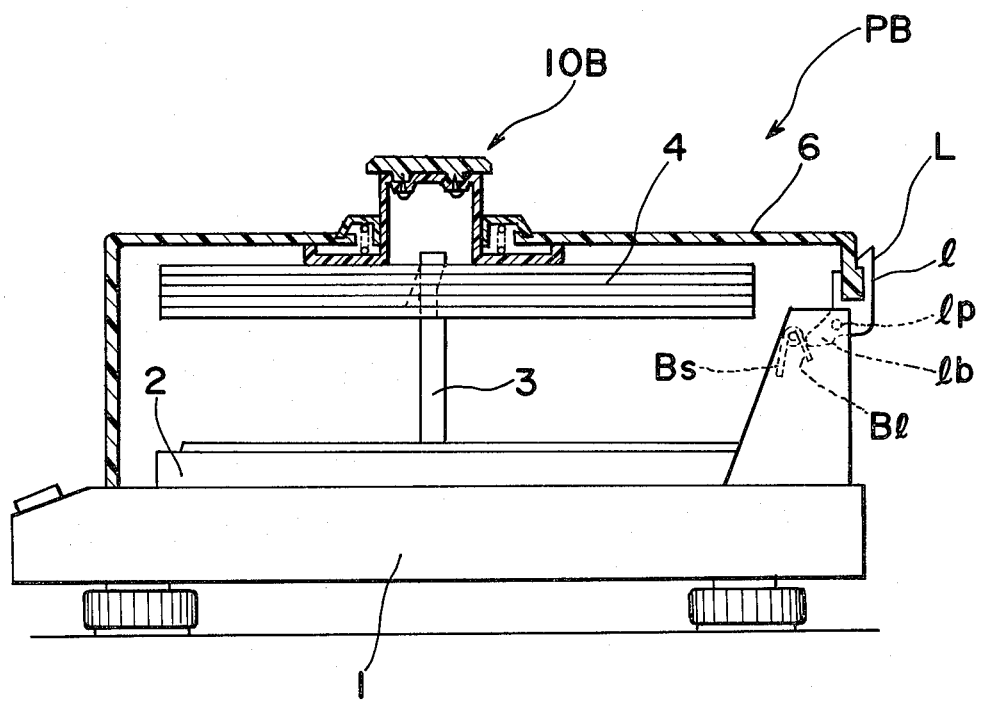
Figure 12:
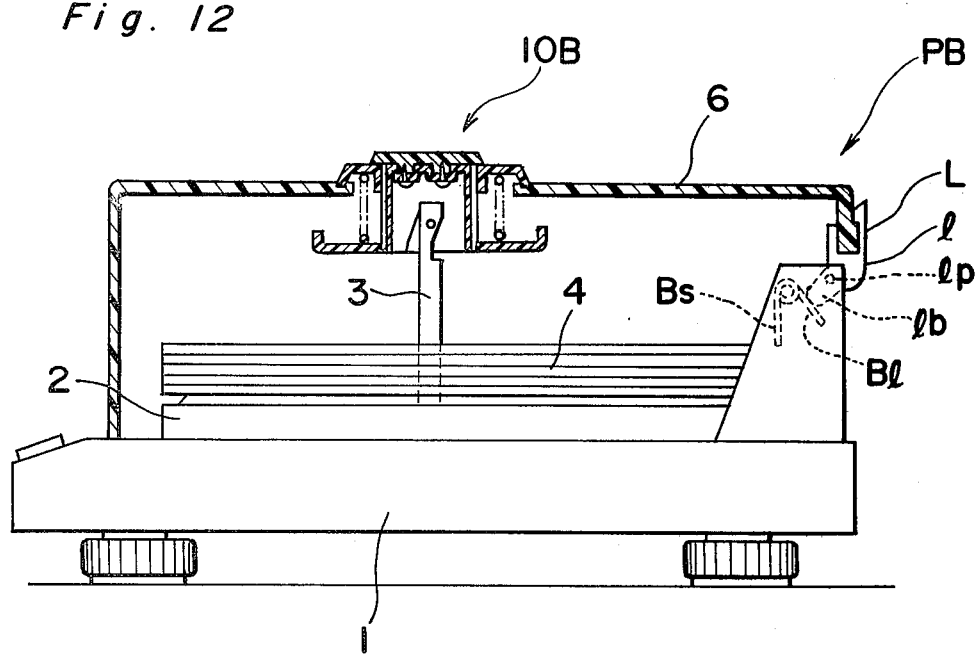

In the above modified record presser 10B, by the employement of the spiral grooves 10G and corresponding spiral projections 6P, the contact area therebetween is advantageously increased, with the cylindrical portion 10B-a being more stabilized in its movements in the vertical and horizontal directions, since it is raised or lowered while being gradually rotated along the spiral projections 6P. As shown in FIGS. 11 and 12, even when all of the records 4 mounted on the changer spindle 3 are dropped onto the turntable 2 as in FIG. 12, the record presser 10B is still held approximately horizontal as in the arrangement of FIG. 6, without any unbalanced appearance.

It is to be noted here that the spiral grooves 10G and spiral projections 6P as described above may be replaced by straight grooves (not shown) formed slantwise in the cylindrical portion 10B-a and corresponding straight projections (not shown) similarly formed slantwise on the inner peripheral edge of the annular member 6D, depending on necessity.

Figure 7:
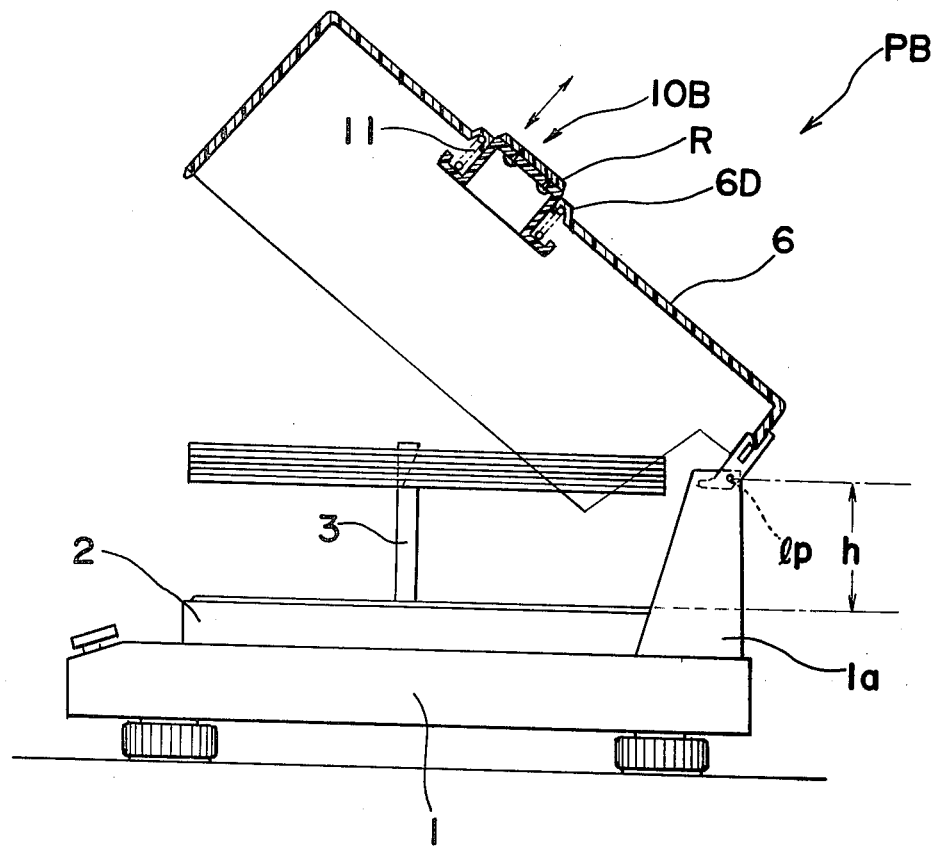
FIG. 7 is a view similar to FIG. 1, which particularly shows a modification thereof.
Figure 8:
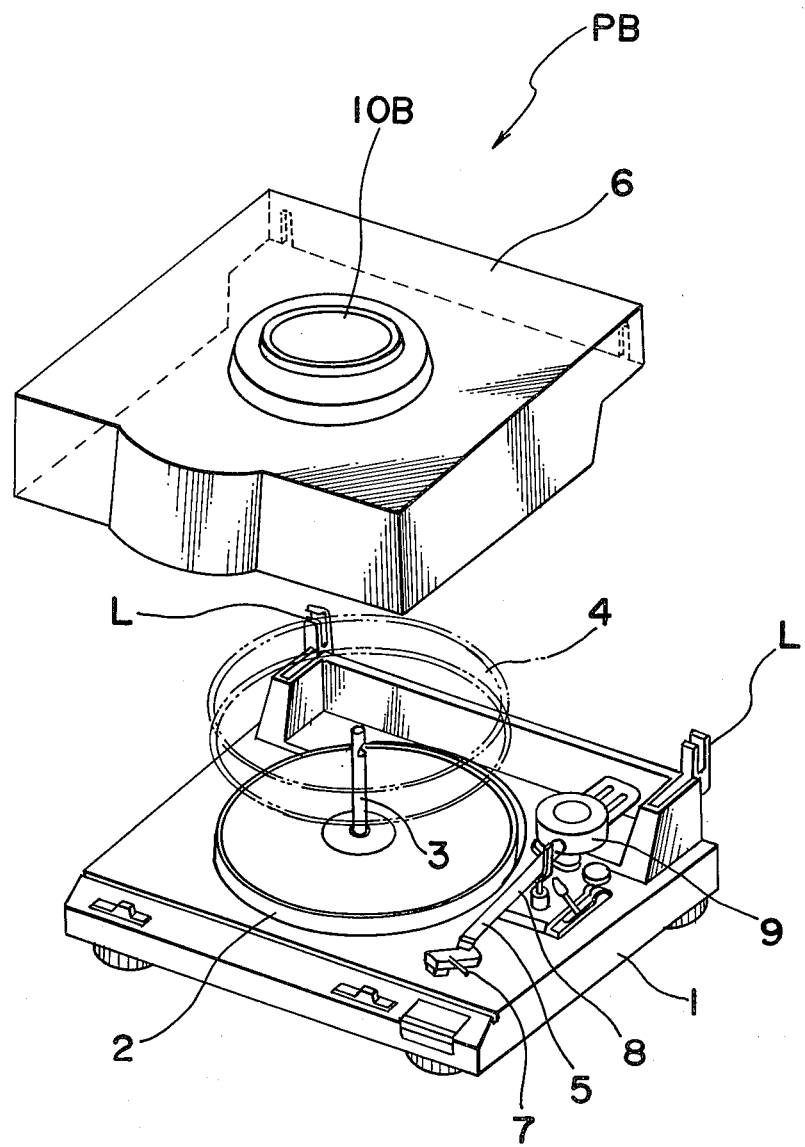
FIG. 8 is an exploded perspective view of the modified record player of FIG. 7.
Figure 9:
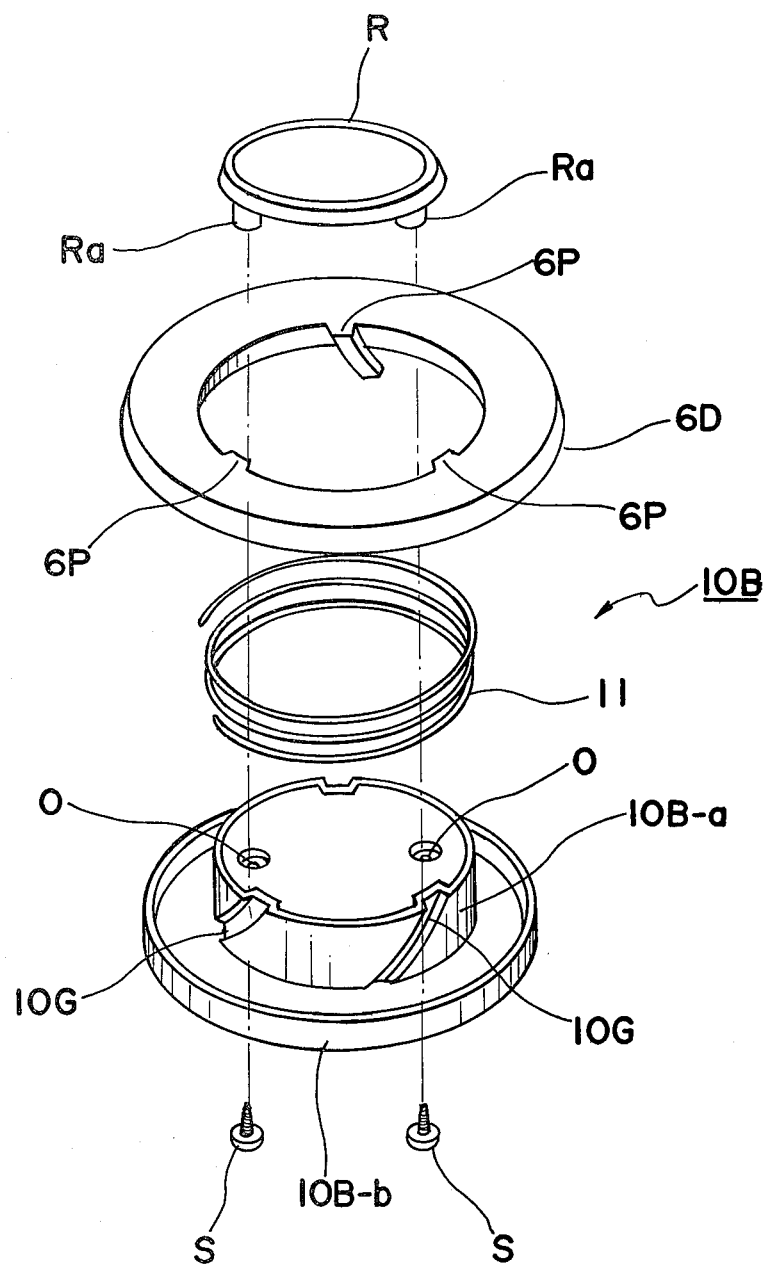
FIG. 9 is an exploded perspective view, showing on an enlarged scale the construction of the modified record presser employed in the arrangement of FIG. 7.
Figure 13:
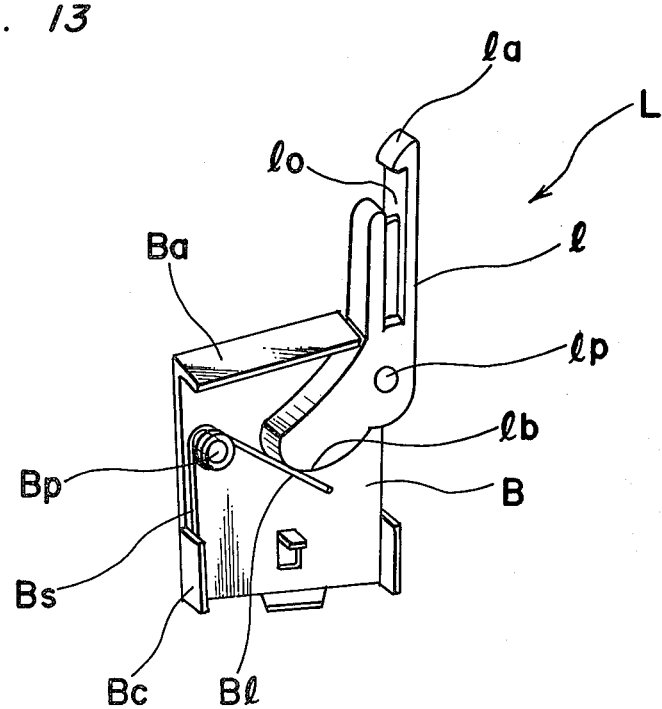
FIG. 13 is a perspective view showing, on an enlarged scale, the construction of a pivotal lever member employed in the modified record player of FIG. 7.

Meanwhile, in the modified record player PB described in the foregoing, the support pins 15 of the dust cover 6 described as employed for the rotary center of the pivotal movement of the dust cover 6 in the arrangement of FIGS. 1 to 6, are replaced by a pair of pivotal lever members L (FIG. 13) secured to upright side walls 1a of the main body 1 of the record player PB (FIG. 7) at the rear portion thereof or at the right side in FIG. 7. As shown in FIG. 13, each of the pivotal lever members L includes a lever 1 which has a slit lo formed at its upper end receiving therein the corresponding rear edge of the dust cover 6 so as to hold such rear edge by a claw la provided at the distal portion of the upper end, and which is pivotally mounted on a base plate B by a pin lp for the rotary center or pivotal axis, with the other end lb of lever l being engaged with a corresponding end Bl of an L-shaped spring Bs also mounted to the base plate B by a pin Bp. The pivotal movement of the lever l is restricted by an upper bent edge Ba of the base plate B, while the other end of the spring Bs is retained by a bent side edge Bc of the base plate B as is most clearly seen in FIG. 13. The pivotal lever members L as described above are suitably fixed to the base plates B thereof, with the pins lp of the levers l for the rotary axis being positioned at a height h from the upper surface of the main body 1, which is approximately the same as the height of the stack of records 4 on the changer spindle 3 (FIG. 7).

By the above arrangement, proper braking force is applied to the rotation of the dust cover 6 until the record presser 10B reaches the position of the records mounted on the changer spindle 3, while the dust cover 6 is relieved from the braking, after the record presser 10B has reached the position of the records set on the changer spindle 3. Accordingly, the record presser 10B is positively brought onto the surface of the records 4 mounted on the changer spindle 3 for holding the stack of the records more stably, when the dust cover 6 is closed, while during closing and opening, the dust cover 6 may be securely supported by the pivotal lever members L at any position irrespective of the degree of the closing or opening.

As is clear from the foregoing description, according to the present invention, since it is so arranged that the plurality of records set on the changer spindle are held to be horizontal by the record presser movably mounted at the central portion of the dust cover, the horizontal state of the records may be maintained merely by the closing of the dust cover, without the necessity of separately providing a control arm or the like. Moreover, owing to the arrangement that the record presser depresses only the level portion at the central part of the records, there is no possibility that the sound grooves of the records are damaged by the record presser. Furthermore, since the record presser is arranged to be movable with respect to the dust cover, the records can be positively held to be horizontal with the dust cover mounted on the main body of the record player, without the necessity for removing the dust cover from the record player.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as included therein.

What is claimed is:

1. A record player comprising:
   a main body;
   a turntable rotatably mounted on said main body for supporting a record to be played;
   a changer spindle extending upwardly from a central portion of said turntable for supporting a stack of records to be lowered one-by-one to said turntable;
   a dust cover pivotally mounted to said main body for selective movement between a closed position and an open position; and
   means for, when said dust cover is in said closed position thereof, maintaining records supported by said changer spindle in a horizontal alignment, said means comprising an opening formed in a central portion of said dust cover, a record presser member movably mounted in said opening and biased for movement with respect to said dust cover in a direction to press against the upper surface of an uppermost record supported by said changer spindle when said dust cover is in said closed position thereof, and means for enabling vertical movement and for preventing horizontal movement of said presser member with respect to said dust cover, said enabling and preventing means comprising recesses formed in one of said dust cover, said presser member or a member adjacent said dust cover and projections extending from another of said presser member, said dust cover or said member adjacent said dust cover, said projections fitting into said recesses, thereby guiding vertical movement of said presser member with respect to said dust cover and restraining relative horizontal movement therebetween.

2. A record player as claimed in claim 1, wherein said presser member is resiliently biased in said direction by a coil spring member.

3. A record player as claimed in claim 1, wherein said presser member is biased in said direction by its weight or by a weight added thereto.

4. A record player as claimed in claim 1, wherein said recesses are circumferentially spaced about the edge of said opening in said dust cover, and said projections are circumferentially spaced about said presser member.

5. A record player as claimed in claim 1, wherein said recesses are circumferentially spaced about said presser member, and said projections are circumferentially spaced about an annular member fixed to said dust cover about said opening.

6. A record player as claimed in claim 1, wherein said recesses and said projections extend vertically when said dust cover is in said closed position thereof.

7. A record player as claimed in claim 1, wherein said recesses and projections are of spiral configuration.

8. A record player as claimed in claim 1, wherein said presser member includes a central cylinder portion having at a lower end thereof a radially outwardly extending flange.

9. A record player as claimed in claim 8, further comprising a coil spring positioned between said flange and said dust cover for biasing said presser member in said direction.

10. A record player as claimed in claim 8, wherein said projections are circumferentially spaced about said cylindrical portion, and said recesses are formed at circumferentially spaced locations in the edge of said opening.

11. A record player as claimed in claim 10, wherein said recesses and projections extend in directions parallel to the axis of said cylindrical portion.

12. A record player as claimed in claim 8, further comprising an annular member fixed to said dust cover about said opening, and wherein said recesses are circumferentially spaced about said cylindrical portion, and said projections are circumferentially spaced about said annular member.

13. A record player as claimed in claim 12, wherein said recesses and projections are of spiral configuration.

14. A record player as claimed in claim 1, wherein said dust cover is pivoted to said main body at an axis located above said turntable by a distance approximately equal to the distance above said turntable of records supported by said change spindle.

15. A record player as claimed in claim 1, further comprising means for applying a braking force to the pivotal movement of said dust cover between said open and closed positions thereof and for removing said braking force when said dust cover reaches a position whereat said presser member contacts a record mounted on said changer spindle.

* * * * *